US012615088B2

(12) United States Patent
Tanaka et al.

(10) Patent No.: US 12,615,088 B2
(45) Date of Patent: Apr. 28, 2026

(54) OPTICAL COMMUNICATION DEVICE, CONTROL METHOD AND OPTICAL COMMUNICATION SYSTEM

(71) Applicant: NTT, Inc., Tokyo (JP)

(72) Inventors: Yasunari Tanaka, Musashino (JP); Shin Kaneko, Musashino (JP); Yumiko Senoo, Musashino (JP); Kazuaki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 350 days.

(21) Appl. No.: 18/267,991

(22) PCT Filed: Dec. 22, 2020

(86) PCT No.: PCT/JP2020/047915
§ 371 (c)(1),
(2) Date: Jun. 16, 2023

(87) PCT Pub. No.: WO2022/137333
PCT Pub. Date: Jun. 30, 2022

(65) Prior Publication Data
US 2024/0056189 A1 Feb. 15, 2024

(51) Int. Cl.
*H04B 10/27* (2013.01)
(52) U.S. Cl.
CPC .................................... *H04B 10/27* (2013.01)
(58) Field of Classification Search
CPC ...................................................... H04B 10/27
See application file for complete search history.

(56) References Cited

U.S. PATENT DOCUMENTS

2014/0270775 A1    9/2014    Sarashina
2019/0372698 A1    12/2019    Hisano et al.
2021/0311233 A1*    10/2021    Zheng .................... H04N 23/72
2021/0344419 A1*    11/2021    Berner .................. H04B 10/40

OTHER PUBLICATIONS

H. Kawahara et al., Optical Full Mesh Network Configuration Technology Supporting All-Photonics Network, NTT Technical Journal, Mar. 2020.

* cited by examiner

*Primary Examiner* — David C Payne
(74) *Attorney, Agent, or Firm* — Harness, Dickey & Pierce, P.L.C.

(57) ABSTRACT

According to an aspect of the present invention, an optical communication device includes: a detection unit that is connected to a user device and detects light which is output from the connected user device; a connection unit that connects the user device and a control transceiver in a case where light is detected by the detection unit; an acquisition unit that acquires, via the control transceiver, communication destination information indicating a communication destination to which the user device requests connection; an assignment unit that assigns a wavelength to the user device according to the communication destination information acquired by the acquisition unit; and a notification unit that notifies the user device of wavelength information indicating the wavelength assigned by the assignment unit via the control transceiver.

8 Claims, 5 Drawing Sheets

10

<u>30</u>

OPTICAL COMMUNICATION DEVICE, CONTROL METHOD AND OPTICAL COMMUNICATION SYSTEM

CROSS-REFERENCE TO RELATED APPLICATIONS

This application is a 371 National Stage of International Application No. PCT/JP2020/047915, filed on Dec. 22, 2020. The entire disclosure of the above application is incorporated herein by reference.

TECHNICAL FIELD

The present invention relates to a technique for an optical communication device, a control method, and an optical communication system.

BACKGROUND ART

The number of users using the high-speed Internet by fiber to the home (FTTH) and mobile services continues to increase. High-speed Internet has become an indispensable part of people's lives.

In a backbone network that provides FTTH and mobile services, a network is independently implemented for each service. For this reason, it is inefficient in terms of operation. Therefore, an access network in which a plurality of services are provided via one device has been proposed.

Further, in order to realize an access network capable of providing multiple services, a passive optical network (PON) such as a wavelength division multiplexing PON (WDM-PON) and a time division multiplexing PON (TDM-PON) that use a plurality of wavelengths has been standardized by the International Telecommunication Union Telecommunication Standardization Sector (ITU-T).

In existing optical communication systems, communication between a subscriber-side device (hereinafter, also referred to as a "user device") and a station is connected to a higher-level core network. The user device is, for example, an optical network unit (ONU).

In addition, the user device is connected to the core network via a terminal device in a station-side apparatus. The terminal device is, for example, an optical line terminal (OLT). In the OLT, an optical signal is once converted into an electrical signal, and processing of adding or deleting user information and destination information, routing processing, and the like are performed on the electrical signal. As a result, a certain amount of delay occurs in communication.

Further, in a case where an amount of data increases, the OLT may store signals in a buffer and perform priority control or the like. As a result, the delay further increases. In a case where the delay increases, a quality of an optical service greatly deteriorates. Thus, it is important to reduce the delay as much as possible.

For this reason, an all-photonics network (APN) that connects certain points while maintaining an optical signal without performing processing of converting an optical signal into an electrical signal has been studied (refer to Non Patent Literature 1). In the APN, there is provided an optical communication device including a management control unit that dynamically assigns a wavelength corresponding to a communication destination to a user device and a switch that switches a path for communication between a user device and a control transceiver and communication between a user device and a requested communication destination. A management control unit included in the optical communication device performs wavelength assignment and path switching of the user device while maintaining an optical signal.

CITATION LIST

Non Patent Literature

Non Patent Literature 1: NTT Technical Review 2020.3, Optical Full-mesh Network Technologies Supporting the All-Photonics Network, [retrieved Dec. 17, 2020], Internet (https://journal.ntt.co.jp/wp-content/uploads/2020/05/JN20200318.pdf)

SUMMARY OF INVENTION

Technical Problem

There are problems that initial connection of a user cannot be detected by the configuration of the APN described above, that setting such as wavelength assignment and path switching cannot be automatically performed, and that it is necessary to manually switch a switch and to connect the user device and the control transceiver.

In view of the above circumstances, an object of the present invention is to provide a technique capable of automatically performing setting for connection of the user device.

Solution to Problem

According to an aspect of the present invention, there is provided an optical communication device including: a detection unit (hereinafter also referred to as "monitor") that is connected to a user device and detects light which is output from the connected user device; a connection unit that connects the user device and a control transceiver in a case where light is detected by the detection unit; an acquisition unit (hereinafter also referred to as "acquirer") that acquires, via the control transceiver, communication destination information indicating a communication destination to which the user device requests connection; an assignment unit (hereinafter also referred to as "assigner") that assigns a wavelength to the user device according to the communication destination information acquired by the acquisition unit; and a notification unit (hereinafter also referred to as "notifier") that notifies the user device of wavelength information indicating the wavelength assigned by the assignment unit via the control transceiver.

According to another aspect of the present invention, there is provided a control method performed by an optical communication device, the method including: a detection step of detecting light which is output from a connected user device; a connection step of connecting the user device and a control transceiver in a case where light is detected in the detection step; an acquisition step of acquiring, via the control transceiver, a communication destination to which the user device requests connection; an assignment step of assigning a wavelength to the user device according to the communication destination acquired in the acquisition step; and a notification step of notifying the user device of wavelength information indicating the wavelength assigned in the assignment step via the control transceiver.

According to still another aspect of the present invention, there is provided an optical communication system including: a plurality of user devices; and an optical communication device, in which the optical communication device includes a detection unit that is connected to a user device and detects light which is output from the connected user device, a connection unit that connects the user device and a control transceiver in a case where light is detected by the detection unit, an acquisition unit that acquires, via the control transceiver, communication destination information indicating a communication destination to which the user device requests connection, an assignment unit that assigns a wavelength to the user device according to the communication destination information acquired by the acquisition unit, and a notification unit that notifies the user device of wavelength information indicating the wavelength assigned by the assignment unit via the control transceiver.

Advantageous Effects of Invention

According to the present invention, it is possible to automatically perform setting for connection of a user device.

DESCRIPTION OF EMBODIMENTS

An embodiment of the present invention will be described in detail with reference to the drawings.

Configuration Example 1

Figure 1:
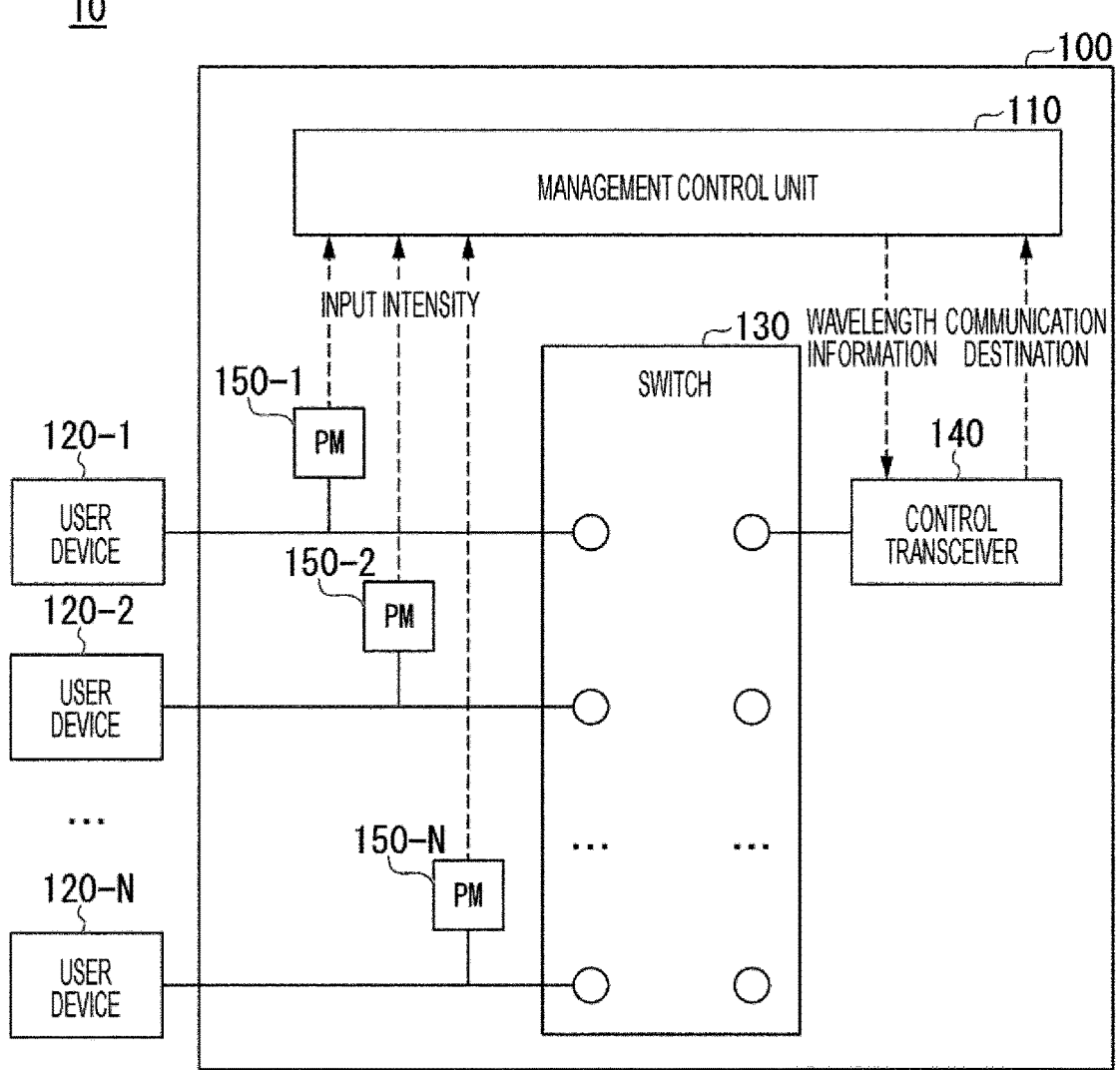
FIG. 1 is a block diagram illustrating a configuration of an optical communication system 10 according to a configuration example 1.

FIG. 1 is a block diagram illustrating a configuration of an optical communication system 10 according to a configuration example 1 of an embodiment. The optical communication system 10 includes an optical communication device 100 and a plurality of user devices 120-1, 120-2, and 120-N. Hereinafter, any one of the user devices 120-1, 120-2, and 120-N (N is an integer equal to or larger than one) will be referred to as a user device 120 in a case where the user devices are not distinguished from each other. The user device 120 is connected to the optical communication device 100. The user device is, for example, an optical network unit (ONU).

The optical communication device 100 includes a management control unit 110, a switch 130, a control transceiver 140, and power monitors (PMs) 150-1, 150-2, and 150-N. Hereinafter, any one of the PMs 150-1, 150-2, and 150-N will be referred to as a PM 150 in a case where the PMs are not distinguished from each other.

The management control unit 110 controls the entire optical communication device 100. When the number of ports on the user device 120 side is N, the switch 130 is an N×M switch. Here, M=N+the number of the control transceivers. The switch 130 connects the user device 120 and the control transceiver 140 or connects the user device 120 and a communication destination requested by the user device 120 according to an instruction from the management control unit 110. The PM 150 is provided for each user device 120. The PM 150 detects light which is output from the connected user device 120. The PM 150 outputs, as an input intensity, an intensity of the detected light to the management control unit 110.

In the configuration example 1, a port of the switch 130 that is connected to the user device 120 and the PM 150 have a one-to-one correspondence. In addition, the management control unit 110 manages the port and the PM 150 corresponding to the port in association with each other. Therefore, in a case where the PM 150 outputs the input intensity, the management control unit 110 can specify the port to which the user device 120 is connected.

Although only one control transceiver 140 is illustrated in FIG. 1, a plurality of control transceivers may be provided. The control transceiver 140 transmits, to the user device 120, wavelength information indicating a wavelength which is assigned from the management control unit 110 to the user device 120. Further, the control transceiver 140 transmits a communication destination requested by the user device 120 to the management control unit 110.

Figure 2:
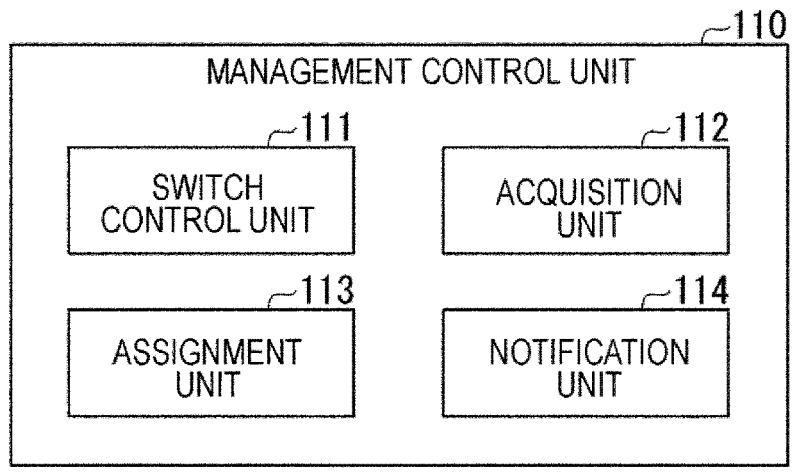
FIG. 2 is a block diagram illustrating a configuration of a management control unit 110.

FIG. 2 is a block diagram illustrating a configuration of the management control unit 110. The management control unit 110 includes a switch control unit 111, an acquisition unit 112, an assignment unit 113, and a notification unit 114. The switch control unit 111 is an example of a connection unit and a communication destination switching unit, and controls the switch 130. Specifically, in a case where the input intensity is input from the PM 150, the switch control unit 111 connects the user device 120 and the control transceiver 140 by using the switch 130. The input of the input intensity from the PM 150 is the same as detection of light by the PM 150. In addition, the switch control unit 111 switches a connection destination of the user device 120 to a communication destination requested by the user device 120 by using the switch 130.

The acquisition unit 112 acquires, via the control transceiver 140, communication destination information indicating a communication destination which is requested for connection by the user device 120. The assignment unit 113 assigns a wavelength to the user device 120 according to the communication destination information acquired by the acquisition unit 112. Specifically, the assignment unit 113 cooperates with a wavelength controller (not illustrated), an optical switch controller, and a management database that manages connection information of all subscribers using the user devices, and assigns individual wavelengths to be used by the user devices. The notification unit 114 notifies the user device 120 of wavelength information indicating the wavelength assigned by the assignment unit 113 via the control transceiver 140. In the following description, the "communication destination information" may be simply referred to as a "communication destination".

In a case where the user device 120 ends communication, a disconnection request is transmitted to the management control unit 110. The management control unit 110 transmits control information to the user device 120 and the switch 130 via the control transceiver 140. Thereby, the user device 120 is caused to stop light output, and a path of the port to which the user device 120 that ends communication is connected, among the ports of the switch 130, is set to a non-connection state. In a case where the path cannot be set to a non-connection state by the switch 130, a certain port is made non-reflective terminated so that the path is connected to the port.

According to the configuration example 1, in a case where light is detected by the PM 150, the optical communication device 100 assigns the wavelength to the user device 120 in response to the light detection. Thereafter, the optical communication device 100 connects the user device 120 and the communication destination requested by the user device 120. As described above, by automatically performing setting for connection of the user device 120, such as wavelength assignment, it is possible to reduce a burden and a mistake due to a manual operation of an operator. Further, according to the configuration example 1, the management control unit 110 assigns the wavelength of the user device 120 and controls the connection between the user device 120 and the communication destination while maintaining the optical signal. Therefore, it is possible to perform optical direct communication. As described above, in the configuration example 1, the optical signal can be processed as it is. Therefore, as compared with processing of converting the optical signal into an electrical signal, it is possible to greatly reduce a delay.

Configuration Example 2

In the configuration example 1, the PM 150 is configured separately from the switch 130. On the other hand, the PM may be included in the switch.

Figure 3:
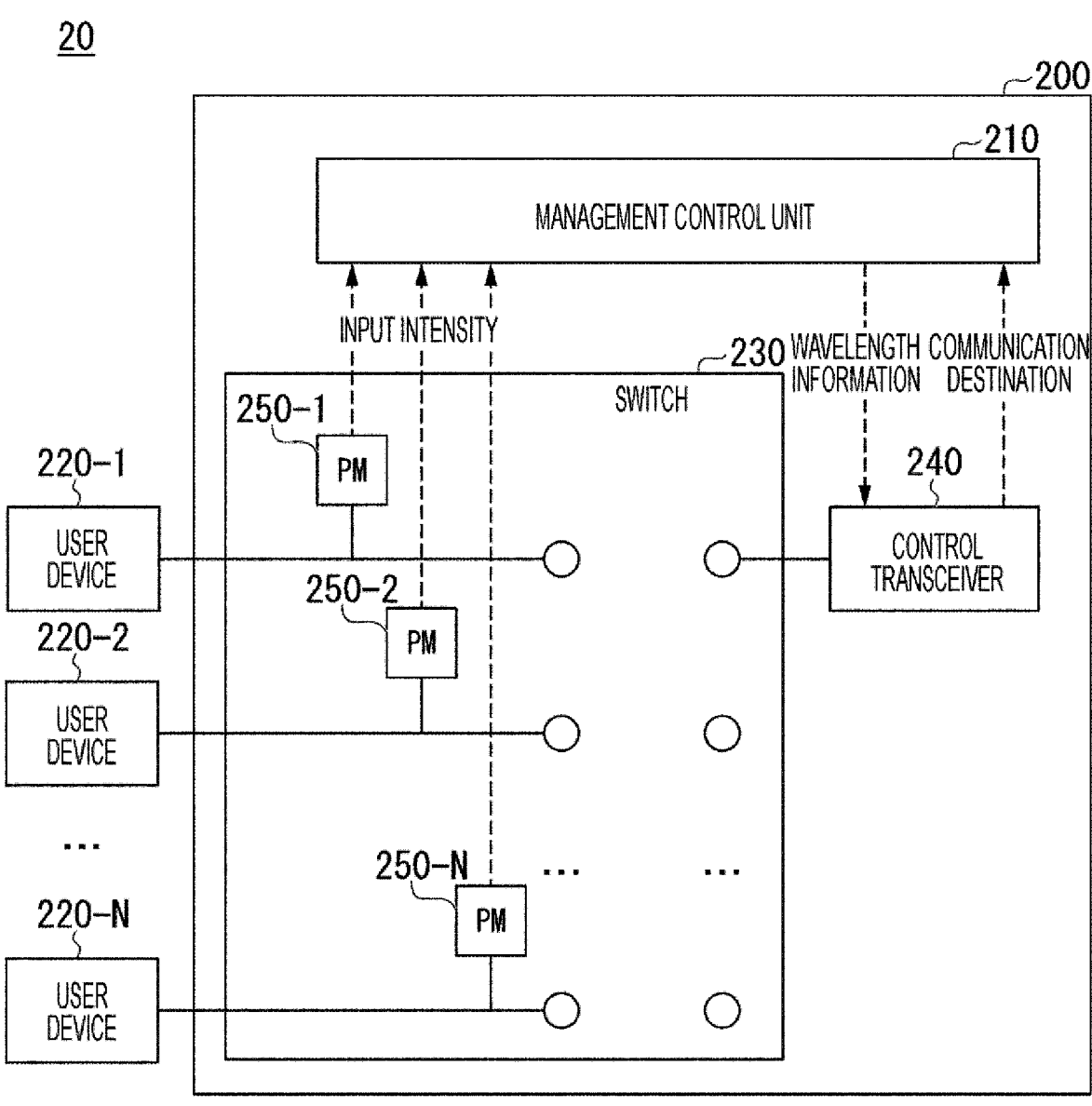
FIG. 3 is a block diagram illustrating a configuration of an optical communication system 20 according to a configuration example 2.

FIG. 3 is a block diagram illustrating a configuration of an optical communication system 20 according to a configuration example 2 of the embodiment. The optical communication system 20 includes an optical communication device 200 and a plurality of user devices 220-1, 220-2, and 220-N (N is an integer equal to or larger one). Hereinafter, any one of the user devices 220-1, 220-2, and 220-N will be referred to as a user device 220 in a case where the user devices are not distinguished from each other. The user device 220 is connected to the optical communication device 200.

The optical communication device 200 includes a management control unit 210, a switch 230, and a control transceiver 240. The management control unit 210 controls the entire optical communication device 200. The switch 230 includes PMs 250-1, 250-2, and 250-N. Hereinafter, any one of the PMs 250-1, 250-2, and 250-N will be referred to as a PM 250 in a case where the PMs are not distinguished from each other.

The management control unit 210 controls the entire optical communication device 200. When the number of ports on the user device 220 side is N, the switch 230 is an N×M switch. Here, M=N+the number of the control transceivers. The switch 230 connects the user device 220 and the control transceiver 240 or connects the user device 220 and a communication destination requested by the user device 220 according to an instruction from the management control unit 210. The PM 250 is provided for each user device 220. The PM 250 detects light which is output from the connected user device 220. The PM 250 outputs, as an input intensity, an intensity of the detected light to the management control unit 210.

In the configuration example 2, a port of the switch 230 that is connected to the user device 220 and the PM 250 have a one-to-one correspondence. In addition, the management control unit 210 manages the port and the PM 250 corresponding to the port in association with each other. Therefore, in a case where the PM 250 outputs the input intensity, the management control unit 210 can specify the port to which the user device 220 is connected.

Although only one control transceiver 240 is illustrated in FIG. 3, a plurality of control transceivers may be provided. The control transceiver 240 transmits, to the user device 220, wavelength information indicating a wavelength which is assigned from the management control unit 210 to the user device 220. Further, the control transceiver 240 transmits a communication destination requested by the user device 220 to the management control unit 210.

The configuration of the management control unit 210 is the same as the configuration of the management control unit 110 in the configuration example 1. Specifically, the switch control unit 111, the acquisition unit 112, the assignment unit 113, and the notification unit 114 in the configuration example 2 will be described. The switch control unit 111 is an example of a connection unit and a communication destination switching unit, and controls the switch 230. Specifically, in a case where the input intensity is input from the PM 250, the switch control unit 111 connects the user device 220 and the control transceiver 240 by using the switch 230. The input of the input intensity from the PM 250 means detection of light by the PM 250. In addition, the switch control unit 111 switches a connection destination of the user device 220 to a communication destination requested by the user device 220 by using the switch 230.

The acquisition unit 112 acquires, via the control transceiver 240, communication destination information indicating a communication destination which is requested for connection by the user device 220. The assignment unit 113 assigns a wavelength to the user device 220 according to the communication destination information acquired by the acquisition unit 112. Specifically, the assignment unit 113 cooperates with a wavelength controller (not illustrated), an optical switch controller, and a management database that manages connection information of all subscribers using the user devices, and assigns individual wavelengths to be used by the user devices. The notification unit 114 notifies the user device 220 of wavelength information indicating the wavelength assigned by the assignment unit 113 via the control transceiver 240.

In a case where the user device 220 ends communication, a disconnection request is transmitted to the management control unit 210. The management control unit 210 transmits control information to the user device 220 and the switch 230 via the control transceiver 240. Thereby, the user device 220 is caused to stop light output, and a path of the port to which the user device 220 that ends communication is connected, among the ports of the switch 230, is set to a non-connection state. In a case where the path cannot be set to a non-connection state by the switch 230, a certain port is made non-reflective terminated, so that the path is connected to the port.

According to the configuration example 2, in a case where light is detected by the PM 250, the optical communication device 200 assigns the wavelength to the user device 220 in response to the light detection. Thereafter, the optical communication device 200 connects the user device 220 and the communication destination requested by the user device 220. As described above, by automatically performing setting for connection of the user device 220, such as wavelength assignment, it is possible to reduce a burden and a mistake due to a manual operation of an operator. Further, according to the configuration example 2, the management control unit 210 assigns the wavelength of the user device 220 and controls the connection between the user device 220 and the communication destination while maintaining the optical signal. Therefore, it is possible to perform optical direct communication. As described above, in the configuration example 2, the optical signal can be processed as it is. Therefore, as compared with processing of converting the optical signal into an electrical signal, it is possible to greatly reduce a delay.

Configuration Example 3

In the configuration examples 1 and 2, the PM is provided for each user device. The configuration example 3 is a configuration example in which one PM is provided.

Figure 4:
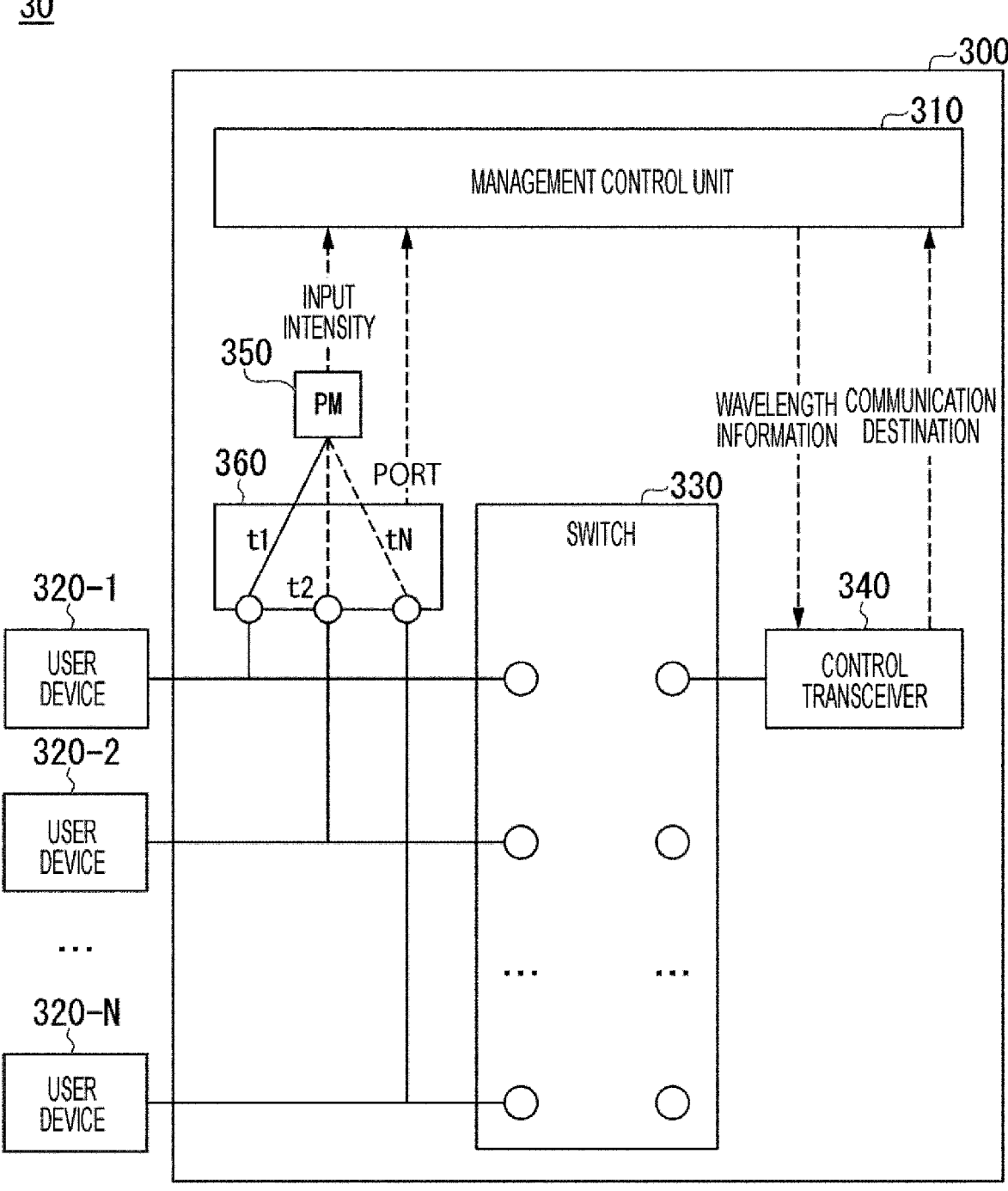
FIG. 4 is a block diagram illustrating a configuration of an optical communication system 30 according to a configuration example 3.

FIG. 4 is a block diagram illustrating a configuration of an optical communication system 30 according to a configuration example 3 of the embodiment. The optical communication system 30 includes an optical communication device 300 and a plurality of user devices 320-1, 320-2, and 320-N. Hereinafter, any one of the user devices 320-1, 320-2, and 320-N (N is an integer equal to or larger than one) will be referred to as a user device 320 in a case where the user devices are not distinguished from each other. The user device 320 is connected to the optical communication device 300.

The optical communication device 300 includes a management control unit 310, switches 330 and 360, a control transceiver 340, and a PM 350.

The management control unit 310 controls the entire optical communication device 300. When the number of ports on the user device 320 side is N, the switch 330 is an N×M switch. Here, M=N+the number of the control transceivers. The switch 330 connects the user device 320 and the control transceiver 340 or connects the user device 320 and a communication destination requested by the user device 320 according to an instruction from the management control unit 310. The PM 350 is connected to the switch 360. The PM 350 detects light which is output from the connected user device 320, via the switch 360. The PM 350 outputs, as an input intensity, an intensity of the detected light to the management control unit 310.

The switch 360 is an example of a user device switching unit. Each time a predetermined condition is satisfied, the switch 360 switches the user device 320 to which the PM 350 is connected. In addition, the switch 360 outputs, to the management control unit 310, port information indicating a port to which the user device 320 connected to the PM 350 is connected. Further, the user device 320 to be switched by the switch 360 is the user device 320 excluding the user device 320 that is already in communication with the communication destination. That is, the switch 360 skips the user device 320 that is in communication with the communication destination, and connects the user device 320 that is not in communication with the communication destination.

In the present embodiment, the predetermined condition is that a predetermined time has elapsed. For example, the user device 320-1 and the PM 350 are connected at a timing t1, and the user device 320-2 and the PM 350 are connected at a timing t2 at which a predetermined time has elapsed from the timing t1. Examples of other predetermined conditions include a case where there is a switching instruction from the management control unit 310.

Figure 5:
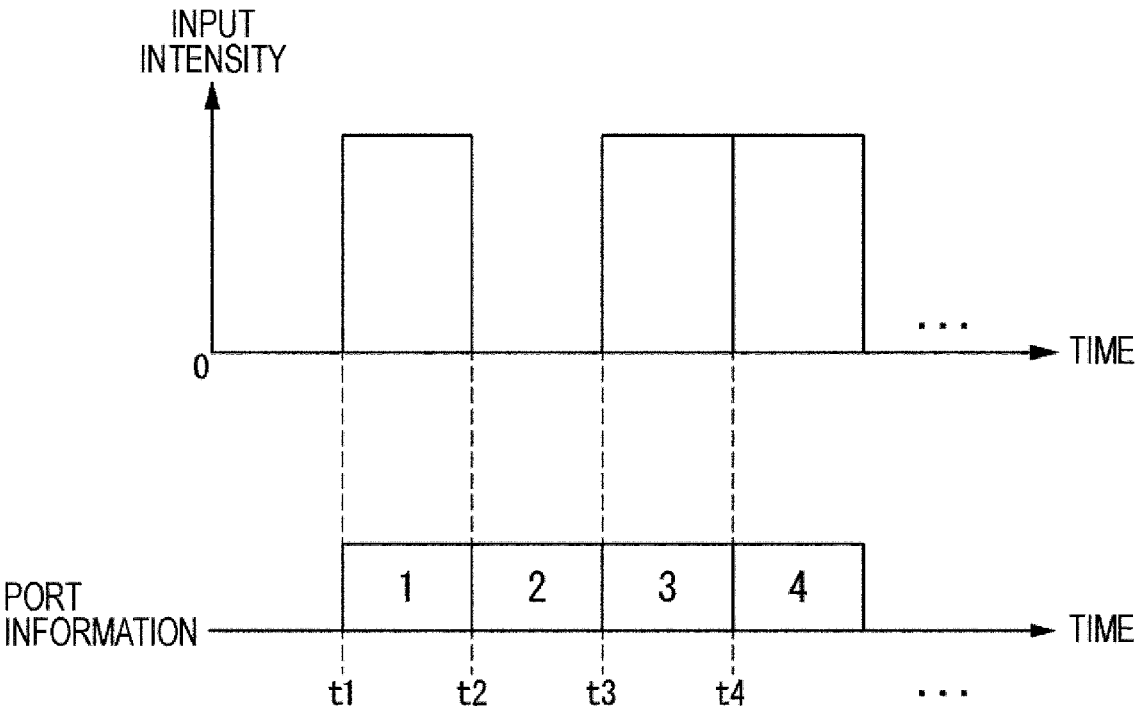
FIG. 5 is a diagram illustrating an output example of an input intensity and port information.

FIG. 5 is a diagram illustrating an output example of the input intensity which is output from the PM 350 and the port information which is output from the switch 360. From a timing t1 to a timing t2, the PM 350 outputs the input intensity larger than 0. The switch 360 outputs, as the port information, "1" that can specify the port. From the timing t2 to a timing t3, light is not detected, and thus the PM 350 does not output the input intensity. The switch 360 outputs, as the port information, "2" that can specify the port. From the timing t3 to a timing t4, the PM 350 outputs the input intensity larger than 0. The switch 360 outputs, as the port information, "3" that can specify the port.

As described above, the input intensity and the port information are input to the management control unit 310, and thus the management control unit 310 can specify the port to which the user device 320 is connected.

Although only one control transceiver 340 is illustrated in FIG. 4, a plurality of control transceivers may be provided. The control transceiver 340 transmits, to the user device 320, wavelength information indicating a wavelength which is assigned from the management control unit 310 to the user device 320. Further, the control transceiver 340 transmits a communication destination requested by the user device 320 to the management control unit 310.

The configuration of the management control unit 310 is the same as the configuration of the management control unit 110 in the configuration example 1. Specifically, the switch control unit 111, the acquisition unit 112, the assignment unit 113, and the notification unit 114 in the configuration example 3 will be described. The switch control unit 111 is an example of a connection unit and a communication destination switching unit, and controls the switch 330. Specifically, in a case where the input intensity is input from the PM 350, the switch control unit 111 connects the user device 320 and the control transceiver 340 by using the switch 330. The input of the input intensity from the PM 350 means detection of light by the PM 350. In addition, the switch control unit 111 switches a connection destination of the user device 320 to a communication destination requested by the user device 320 by using the switch 330.

The acquisition unit 112 acquires, via the control transceiver 340, communication destination information indicating a communication destination which is requested for connection by the user device 320. The assignment unit 113 assigns a wavelength to the user device 320 according to the communication destination information acquired by the acquisition unit 112. Specifically, the assignment unit 113 cooperates with a wavelength controller (not illustrated), an optical switch controller, and a management database that manages connection information of all subscribers using the user devices, and assigns individual wavelengths to be used by the user devices. The notification unit 114 notifies the user device 320 of wavelength information indicating the wavelength assigned by the assignment unit 113 via the control transceiver 340.

In a case where the user device 320 ends communication, a disconnection request is transmitted to the management control unit 310. The management control unit 310 transmits control information to the user device 320 and the switch 330 via the control transceiver 340. Thereby, the user device 320 is caused to stop light output, and a path of the port to which the user device 320 that ends communication is connected, among the ports of the switch 330, is set to a non-connection state. In a case where the path cannot be set to a non-connection state by the switch 330, a certain port is made non-reflective terminated so that the path is connected to the port.

According to the configuration example 3, in a case where light is detected by the PM 350, the optical communication device 300 assigns the wavelength to the user device 320 in response to the light detection. Thereafter, the optical communication device 300 connects the user device 320 and the communication destination requested by the user device 320. As described above, by automatically performing setting for connection of the user device 320, such as wavelength assignment, it is possible to reduce a burden and a mistake due to a manual operation of an operator. Further, according to the configuration example 3, the management control unit 310 assigns the wavelength of the user device 320 and controls the connection between the user device 320 and the communication destination while maintaining the optical signal. Therefore, it is possible to perform optical direct communication. As described above, in the configuration example 3, the optical signal can be processed as it is. Therefore, as compared with processing of converting the optical signal into an electrical signal, it is possible to greatly reduce a delay.

Further, in the configuration example 3, one PM is sufficient. Thus, a lower cost can be expected as compared with the configuration examples 1 and 2. In particular, as the number of the user devices 320 is larger, a lower cost can be obtained as compared with the configuration examples 1 and 2.

Configuration Example 4

In the configuration examples 1 and 2, the PM is provided for each user device. The configuration example 4 is a configuration example in which one PM is provided. Further, in the configuration example 3, two switches are provided. The configuration example 4 is a configuration example in which one switch is provided.

Figure 6:
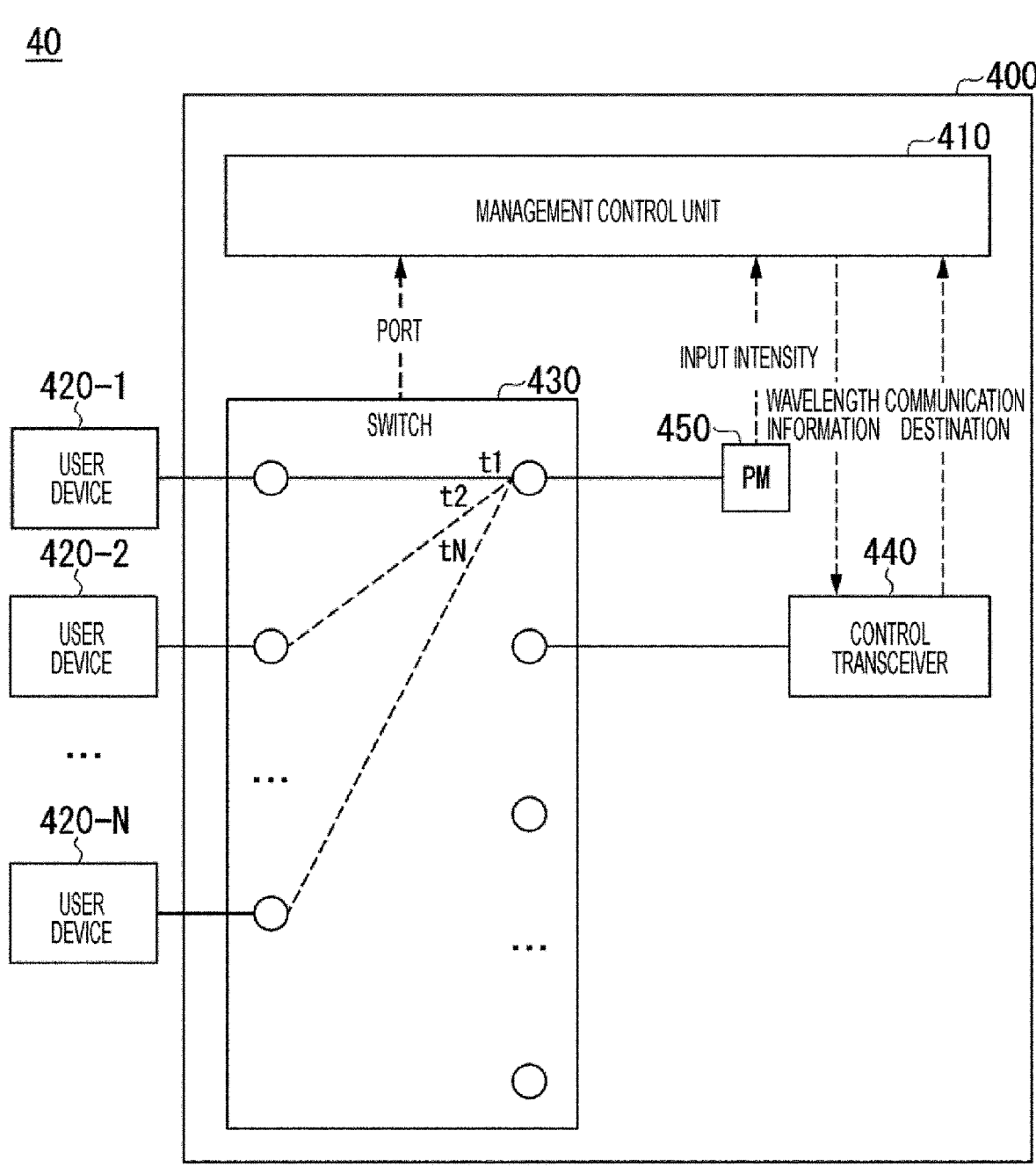
FIG. 6 is a block diagram illustrating a configuration of an optical communication system 40 according to a configuration example 4.

FIG. 6 is a block diagram illustrating a configuration of an optical communication system 40 according to a configuration example 4 of the embodiment. The optical communication system 40 includes an optical communication device 400 and a plurality of user devices 420-1, 420-2, and 420-N. Hereinafter, any one of the user devices 420-1, 420-2, and 420-N (N is an integer equal to or larger than one) will be referred to as a user device 420 in a case where the user devices are not distinguished from each other. The user device 420 is connected to the optical communication device 400.

The optical communication device 400 includes a management control unit 410, a switch 430, a control transceiver 440, and a PM 450.

The management control unit 410 controls the entire optical communication device 400. The switch 430 connects the user device 420 and the control transceiver 440 or connects the user device 420 and a communication destination requested by the user device 420 according to an instruction from the management control unit 410. Further, the switch 430 is connected to the PM 450.

The PM 450 detects light which is output from the connected user device 420, via the switch 430. The PM 450 outputs, as an input intensity, an intensity of the detected light to the management control unit 410.

The switch 430 is an example of a user device switching unit. When the number of ports on the user device 420 side is N, the switch 430 is an N×M switch. Here, M=N+1 (for PM)+the number of the control transceivers. Each time a predetermined condition is satisfied, the switch 430 switches the user device 420 to which the PM 450 is connected. In addition, the switch 430 outputs, to the management control unit 410, port information indicating a port to which the user device 420 connected to the PM 450 is connected. Further, the user device 420 to be switched by the switch 430 is the user device 420 excluding the user device 420 that is already in communication with the communication destination. That is, the switch 430 skips the user device 420 that is in communication with the communication destination, and connects the user device 420 that is not in communication with the communication destination.

In the present embodiment, the predetermined condition is that a predetermined time has elapsed. For example, the user device 420-1 and the PM 450 are connected at a timing t1, and the user device 420-2 and the PM 450 are connected at a timing t2 at which a predetermined time has elapsed from the timing t1. Examples of other predetermined conditions include a case where there is a switching instruction from the management control unit 410.

An output example of the input intensity which is output from the PM 450 and the port information which is output from the switch 430 is the same as the output example illustrated in FIG. 5. The input intensity and the port information are input to the management control unit 410, and thus the management control unit 410 can specify the port to which the user device 420 is connected.

Although only one control transceiver 440 is illustrated in FIG. 6, a plurality of control transceivers may be provided. The control transceiver 440 transmits, to the user device 420, wavelength information indicating a wavelength which is assigned from the management control unit 410 to the user device 420. Further, the control transceiver 440 transmits a communication destination requested by the user device 420 to the management control unit 410.

The configuration of the management control unit 410 is the same as the configuration of the management control unit 110 in the configuration example 1. Specifically, the switch control unit 111, the acquisition unit 112, the assignment unit 113, and the notification unit 114 in the configuration example 4 will be described. The switch control unit 111 is an example of a connection unit and a communication destination switching unit, and controls the switch 430. Specifically, in a case where the input intensity is input from the PM 450, the switch control unit 111 connects the user device 420 and the control transceiver 440 by using the switch 430. The input of the input intensity from the PM 450 means detection of light by the PM 450. In addition, the switch control unit 111 switches a connection destination of the user device 420 to a communication destination requested by the user device 420 by using the switch 430.

The acquisition unit 112 acquires, via the control transceiver 440, communication destination information indicating a communication destination which is requested for connection by the user device 420. The assignment unit 113 assigns a wavelength to the user device 420 according to the communication destination information acquired by the acquisition unit 112. Specifically, the assignment unit 113 cooperates with a wavelength controller (not illustrated), an optical switch controller, and a management database that manages connection information of all subscribers using the user devices, and assigns individual wavelengths to be used by the user devices. The notification unit 114 notifies the user device 420 of wavelength information indicating the wavelength assigned by the assignment unit 113 via the control transceiver 440.

In a case where the user device 420 ends communication, a disconnection request is transmitted to the management control unit 410. The management control unit 410 transmits control information to the user device 420 and the switch 430 via the control transceiver 440. Thereby, the user device 420 is caused to stop light output, and a path of the port to which the user device 420 that ends communication is connected, among the ports of the switch 430, is set to a non-connection state. In a case where the path cannot be set to a non-connection state by the switch 430, a certain port is made non-reflective terminated so that the path is connected to the port.

According to the configuration example 4, in a case where light is detected by the PM 450, the optical communication device 400 assigns the wavelength to the user device 420 in response to the light detection. Thereafter, the optical communication device 400 connects the user device 420 and the communication destination requested by the user device 420. As described above, by automatically performing setting for connection of the user device 420, such as wavelength assignment, it is possible to reduce a burden and a mistake due to a manual operation of an operator. Further, according to the configuration example 4, the management control unit 410 assigns the wavelength of the user device 420 and controls the connection between the user device 420 and the communication destination while maintaining the optical signal. Therefore, it is possible to perform optical direct communication. As described above, in the configuration example 4, the optical signal can be processed as it is. Therefore, as compared with processing of converting the optical signal into an electrical signal, it is possible to greatly reduce a delay.

Further, in the configuration example 4, one PM is sufficient. Thus, a lower cost can be expected as compared with the configuration examples 1 and 2. In particular, as the number of the user devices 420 is larger, a lower cost can be obtained as compared with the configuration examples 1 and 2. In addition, in the configuration example 4, one switch is sufficient. Thus, a lower cost can be expected as compared with the configuration example 3.

The management control unit 110, 210, 310, or 410 may be configured by using a processor such as a central processing unit (CPU) and a memory. In this case, the processor executes a program, and thus the management control unit 110, 210, 310, or 410 functions as the management control unit 110, 210, 310, or 410. Note that all or some functions of the management control unit 110, 210, 310, or 410 may be implemented using hardware such as an application specific integrated circuit (ASIC), a programmable logic device (PLD), or a field programmable gate array (FPGA). The program may be recorded in a computer-readable recording medium. Examples of the computer-readable recording medium include a portable medium such as a flexible disk, a magneto-optical disk, a ROM, a CD-ROM, or a semiconductor storage device (for example, a solid state drive (SSD)), and a storage device such as a hard disk or a semiconductor storage device included in a computer system. The program may be transmitted via an electric communication line.

Although the embodiment of the present invention has been described in detail with reference to the drawings, specific configurations are not limited to the embodiment, and include design and the like within the scope of the present invention without departing from the gist of the present invention.

INDUSTRIAL APPLICABILITY

The present invention can be applied to an optical communication device and an optical transmission system that are connected to a user device.

REFERENCE SIGNS LIST

10, 20, 30, 40 Optical communication system
100, 200, 300, 400 Optical communication device

110, 210, 310, 410 Management control unit
111 Switch control unit
112 Acquisition unit
113 Assignment unit
114 Notification unit
120, 120-1, 120-2, 120-N, 220, 220-1, 220-2, 220-N, 320, 320-1,
320-2, 320-N, 420, 420-1, 420-2, 420-N User device
130, 230, 330, 360, 430 Switch
140, 240, 340, 440 Control transceiver

The invention claimed is:

1. An optical communication device connected to a plurality of user devices, the optical communication device comprising:
   a plurality of monitors that detect light which is output from the plurality of user devices that are connected, respectively;
   a controller that connects, by using a switch based on correspondence between the plurality of monitors and a plurality of ports of the switch, a user device corresponding to a monitor that detects the light and a control transceiver while maintaining the light, upon detection of the light by any of the plurality of monitors;
   an acquirer that acquires, via the control transceiver connected to the user device by the switch while maintaining the light, communication destination information indicating a communication destination to which the user device requests connection;
   an assigner that assigns a wavelength to the user device according to the communication destination information acquired by the acquirer; and
   a notifier that notifies the user device of wavelength information indicating the wavelength assigned by the assigner via the control transceiver.

2. The optical communication device according to claim 1,
   wherein the controller switches a connection destination of the user device to the communication destination in a case of receiving a notification of the wavelength information assigned to the user device, from the notifier.

3. The optical communication device according to claim 1,
   wherein the plurality of monitors are provided for the plurality of user devices.

4. An optical communication device connected to a plurality of user devices, the optical communication device comprising:
   a monitor that detects light which is output from a user device that is connected;
   a user switch that switches the user device to which the monitor is connected each time a predetermined condition is satisfied,
   a controller that connects, by using a switch based on correspondence between the plurality of user devices and a plurality of ports of the switch, the user device connected to the monitor and a control transceiver while maintaining the light, upon detection of the light by the monitor;
   an acquirer that acquires, via the control transceiver connected to the user device by the switch while maintaining the light, communication destination information indicating a communication destination to which the user device requests connection;

an assigner that assigns a wavelength to the user device according to the communication destination information acquired by the acquirer; and a notifier that notifies the user device of wavelength information indicating the wavelength assigned by the assigner via the control transceiver.

5. The optical communication device according to claim 4, wherein the user device to be switched by the user switch is a user device other than the user device that is already in communication with the communication destination.

6. A control method performed by an optical communication device connected to a plurality of user devices, the method comprising:

detecting by a plurality of monitors, light which is output from the plurality of user devices that are connected, respectively;

connecting by a controller, by using a switch based on correspondence between the plurality of monitors and a plurality of ports of the switch, a user device corresponding to a monitor that detects the light and a control transceiver while maintaining the light, upon detection of the light by any of the plurality of monitors in the detecting;

acquiring by an acquirer, via the control transceiver connected to the at least one user device by the switch while maintaining the light, a communication destination to which the user device requests connection;

assigning by an assigner, a wavelength to the user device according to the communication destination acquired in the acquiring; and notifying by a notifier, the user device of wavelength information indicating the wavelength assigned in the assigning via the control transceiver.

7. The optical communication device according to claim 4, wherein the user switch sequentially switches the user device, to which the monitor is connected, between the plurality of user devices corresponding to a plurality of ports of the user switch, each time the predetermined condition indicating that a predetermined time has elapsed is satisfied.

8. The optical communication device according to claim 4, wherein the user switch sequentially switches the user device, to which the monitor is connected, to another user device, which is not in communication with the communication destination, among the plurality of user devices.

* * * * *